Figure 1:
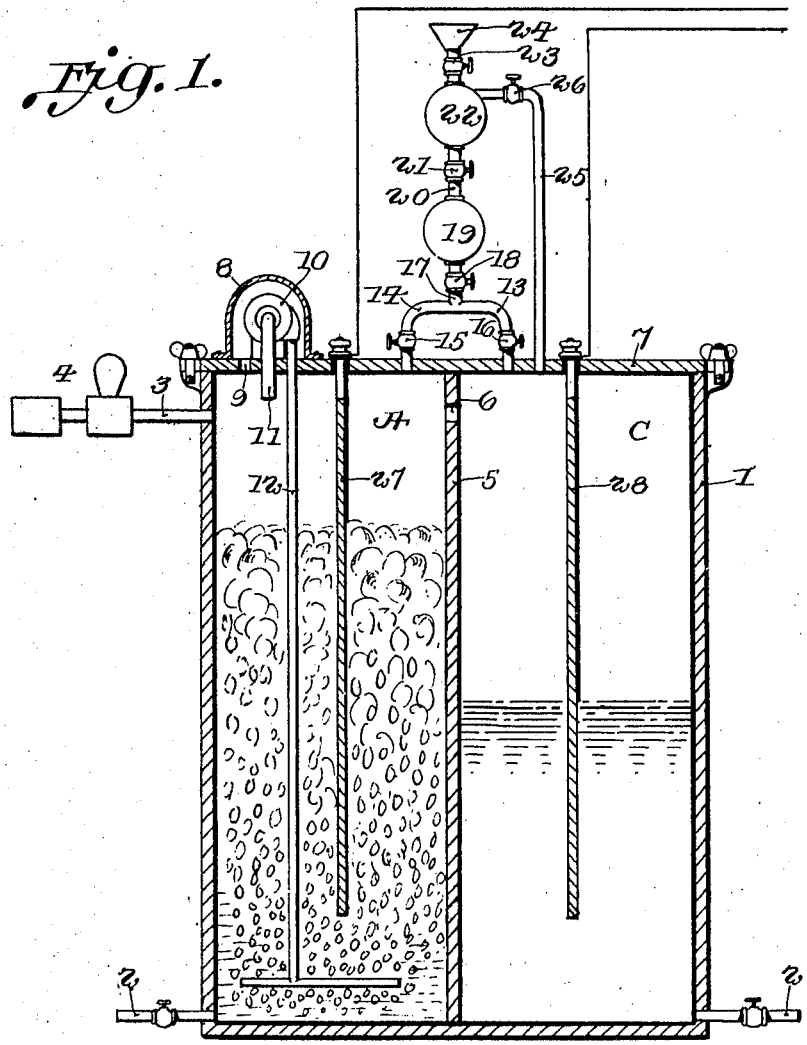

K. P. McELROY.
PROCESS OF OXIDIZING HYDROCARBONS.
APPLICATION FILED JUNE 26, 1917.

1,308,797.

Patented July 8, 1919.
2 SHEETS—SHEET 1.

Witness
Inventor
K. P. McElroy

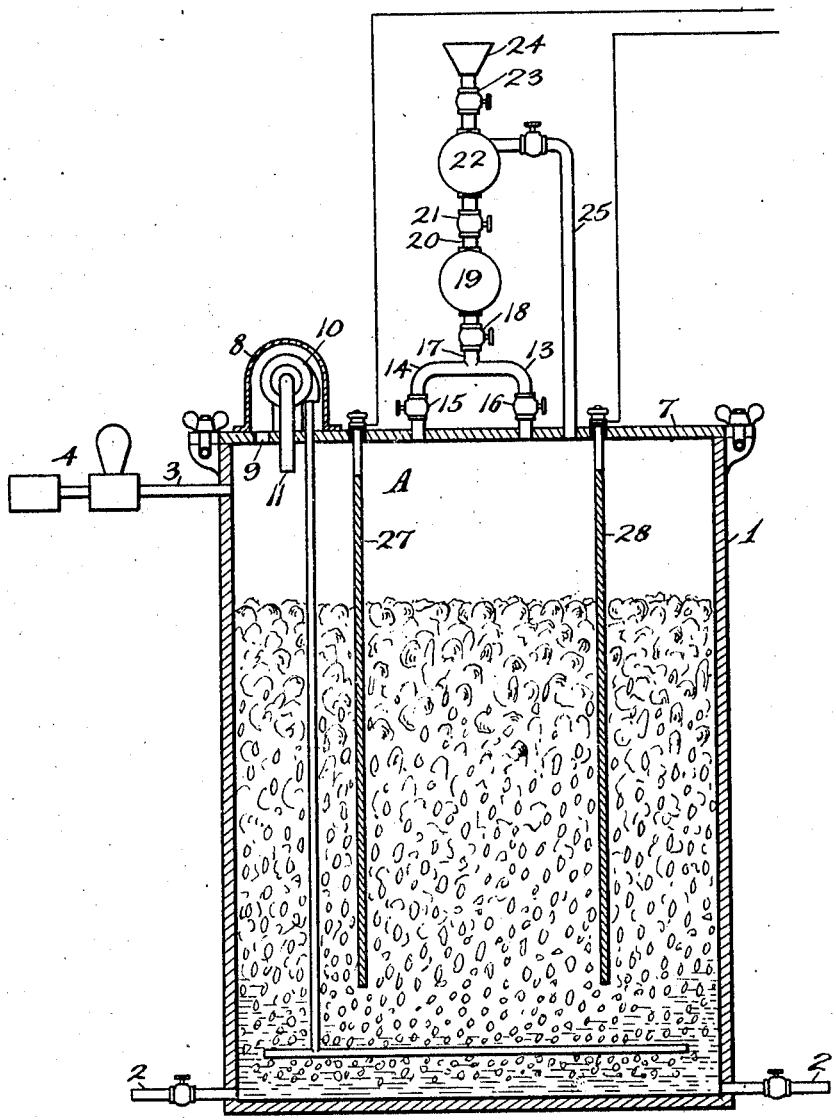

UNITED STATES PATENT OFFICE.

KARL P. McELROY, OF WASHINGTON, DISTRICT OF COLUMBIA, ASSIGNOR TO CHEMICAL DEVELOPMENT COMPANY, A CORPORATION OF MAINE.

PROCESS OF OXIDIZING HYDROCARBONS.

1,308,797.  Specification of Letters Patent.  Patented July 8, 1919.

Application filed June 26 1917. Serial No. 177,028.

*To all whom it may concern:*

Be it known that I, KARL P. McELROY, a citizen of the United States, residing at Washington, in the District of Columbia, have invented certain new and useful Improvements in Processes of Oxidizing Hydrocarbons, of which the following is a specification.

This invention relates to processes of oxidizing hydrocarbons, and it comprises a method of producing useful products from unsaturated hydrocarbons, and particularly from olefin hydrocarbons, wherein such a hydrocarobon is submitted to direct oxidation in solution with the aid of a catalyst, and particularly a metal of the platinum group, oxygen for oxidation being supplied in the form of an oxidizing salt or other suitable source of oxidation.

There are various oxygen-containing or oxidized derivatives of the olefins, such as the glycols, the chlorhydrin, glycol esters, glycol ethers, olefin oxids, etc., having properties which would render them useful in various arts if such derivatives could be produced by a method sufficiently simple, cheap and ready to make them commercially available. At present however these bodies are not available for technical purposes being merely laboratory curiosities, made when wanted for scientific purposes by indirect, cumbrous and wasteful methods. For example, ethylene, ordinarily made from alcohol, is converted into a dihalid and this is then saponified or esterified to replace the halogen by other groups. Saponification and esterification are both operations attended with some difficulty and giving small yields since the dihalids are stable, little reactive substances. Ethylene glycol, for example, is usually made for scientific purposes by converting ethylene, produced from alcohol, into the dibromid, converting the dibromid into an acetic ester and finally saponifying the latter by alkali.

It is an object of the present invention to obtain these potentially valuable oxidized bodies from ethylene and other olefins in the gaseous condition by a direct limited oxidation under controlled conditions. Ethylene which is typical of the other olefinic gases is a readily oxidizable substance, but, being endothermerically constituted, oxidation is attended with the liberation of much energy and is apt to be too far going, and furthermore the direct products of its limited oxidation, ethylene oxid, glycol and chlorhydrin are themselves also readily oxidizable. Etheylene oxid, which is the first product of oxidation, is particularly sensitive; glycol is more resistive.

I have found however that under suitable conditions the oxidation of the olefins, for example, ethylene can be limited and regulated to the desired degree and that such a limited oxidation of an olefin such as ethylene itself is, so to speak, preferential over the further oxidation of these proximate oxidation products; that is, so long as unattacked ethylene remains in the sphere of reaction the oxidation merely goes to the first stage and the ethylene exercises a protective action shielding the proximate products from further attack.

Dilution is useful in the limited oxidation of ethylene in the gaseous state by chlorin and steam, steam being best present in ample amount, and by oxygen in the presence or absence of catalytics, such as platinum black, labile oxids, nitrous vapors, etc.; and in the treatment of ethylene dissolved in various liquids; advantageously an aqueous liquid. The solubility of ethylene in most aqueous liquids is relatively small so that even a saturated solution thereof is still actually, as regards the ethylene, very dilute and the heat of oxidation becomes a limited quantity readily taken up and controlled by the liquid solvent. In fact the solubility of ethylene as ethylene in most aqueous liquids is so small as compared with that of many of the ordinary oxidants that in oxidizing in aqueous solutions special means must ordinarily be adopted to maintain the ethylene solution replenished with the gas and prevent the chance of an excess of such oxidant existing at any time during the reaction.

Several expedients to this end may be employed. One is an increase in pressure which causes a concomitant increase in the solubility of ethylene. With 15 pounds gage pressure, the amount which can be held in solution and drawn upon for reaction is about doubled. Another is quicker replenishment of the supply of dissolved ethylene by filming the liquid or otherwise increasing the area of contact between liquid and gas. Vigorous agitation of the liquid to prevent localized changes in the relative concentration of ethylene and oxidant is desirable. The increase in area of contact and the agitation may be simultaneously attained and a number of other desirable results secured by causing a cyclic circulation of the gas to, through and back to the reaction liquid; that is with a reaction chamber having a gas feed and means for withdrawal of waste gas there may be provided additional means capable of continuously taking gas from above the body of liquid and again bubbling it therethrough. Advantageously there may be employed a fan or blower. The fan means may be, and advantageously is, speeded up so as to maintain an emulsion of liquid and gas.

Another expedient often useful is to maintain porous, absorptive materials, such as charcoal, coke, boneblack, platinum black, etc., suspended in the liquid in which the oxidant is contained or in which it is being developed to absorb gas and re-deliver it to the liquid. Such bodies may, and usually do, superadd a useful catalytic effect in aiding oxidation. For example, ethylene and air may be supplied to a hot liquid holding platinum black or colloidal palladium or the like in suspension.

Where the unsaturated hydrocarbon is ethylene it may be produced from any of the usual sources, as by dehydrating alcohol, by hydrogenating acetylene or by destructive distillation or cracking of coal, oil or other carbonaceous bodies. Using ordinary coal gas as a source of olefins, such as ethylene, it is useful to extract the ethylene and other olefinic gases by means of wash oil. From the wash oil, the olefinic gases may be separated in a concentrated state by heating or vacuum.

By proper precaution petroleum oil may be cracked down to form gas mixtures rich in ethylene, propylene and the butylenes; and useful in the present invention. Acetylene may be hydrogenated to ethylene by catalytics or electrolytically.

Many oxidants may be used in the present invention, such as oxidizing salts, like permanganates, chromates, vanadates, arsenates, etc., in acid, alkaline or neutral baths. Peroxidized bodies, such as hydrogen peroxid, barium peroxid, calcium peroxid, sodium peroxid, perborates, persulfates, etc., may also be used. Manganese binoxid and an acid may be employed. Bleaching powder containing a trace of cobalt or other catalytic causing an evolution of nascent oxygen may be used. When ethylene chlorhydrin is desired, the bleaching powder may be acidulated with a weak acid.

With many of these oxidants, the addition of the same or the development of its oxidizing influence should be proportionate to the rate of solution of ethylene; there should always be unattacked ethylene in the sphere of reaction.

The drawings illustrate, diagrammatically, apparatus which is suitable for carrying out the invention. Figure 1 shows apparatus with a diaphragm and Fig. 2 shows another type of apparatus not employing a diaphragm.

The invention is particularly intended to be carried out in an electrolytic cell, and in this case any suitable electrolyte may be used, such as salt (sodium chlorid), sodium sulfate, phosphates, borates, etc. Electrolysis may be in a divided cell, as shown in Fig. 1, that is a cell having a diaphragm separating the cell into an anode compartment and a cathode compartment; or in an undivided or diaphragmless cell, such as those used in electrolyzing sodium chlorid solutions to make hypochlorites and other oxidized chlorin-containing products; as shown in Fig. 2. The results differ with the type of cell. With a divided cell, electrolysis necessarily develops oxidizing conditions and acidity in the anode chamber and reducing conditions and basicity in the cathode chamber. In such a cell using a chlorid electrolyte, part of the chlorin developed goes into combination with the ethylene, etc., to form chlorhydrins. Using such a cell, the anode liquor and cathode liquor may be ultimately reunited to form a neutral liquid from which the oxidation products of the ethylene, etc., may be regained. With an undivided cell, the electrolyte remains neutral but oxidizing conditions develop while hydrogen escapes. If the electrolyte contains an oxygen salt such as a sulfate, borate, etc., the oxygen mostly develops as such and for economy it must be used (that is taken up by the olefin) as fast as it is produced since these salts themselves do not ordinarily oxidize to any great extent; that is there is not much tendency, except under special conditions, to form persulfates and the like. The use of carrier oxidants, such as chromium salts, iron salts, cerium salts, manganese salts, etc., however may be resorted to since such salts are able to take up and redeliver oxygen. With a chlorid salt, such as sodium chlorid, in an undivided cell, the circumstances are different since the net effect of development of oxidation is then a production of oxidizing salts such as hypochlorites and chlorates. These are oxidizing salts which may be used to redeliver oxygen with the aid of suitable catalysts. Therefore any oxygen not at once taken up by the olefin may be, so to speak, stored. With an undivided cell the solution, as stated, remains neutral and these oxidized chlorin products have, in neutral solution, no violent oxidizing action. Any suitable anode metal and cathode metal may be used.

With salt (sodium chlorid) and other halogen compounds in a divided cell, on oxidizing ethylene in the anode chamber, the product is generally ethylene chlorhydrin which may be saponified to glycol with the soda accumulating in the cathode compartment. In forming chlorhydrin, chlorin goes into organic combination and the net result is the formation and accumulation in the cathode chamber of an excess of alkali corresponding to the amount of chlorin so removed. On saponification (removal of the chlorin from organic combination), with this excess of alkali a neutral liquor is once more formed.

In electrolyzing a salt solution in an undivided cell in the usual ways as stated the salt may be in effect oxidized with formation of hypochlorites and chlorates but the neutrality of the solution does not change. If this electrolysis be performed in the presence of olefins, etc., the net result is the formation of glycols; and it is immaterial here whether this result is a direct oxidation of the ethylene in preference to the salt, is a preliminary oxidation of the salt to hypochlorite, etc., with transference of oxygen from the oxidized salt to the ethylene, or is a preliminary formation of chlorhydrin with subsequent saponification to glycol by the alkali simultaneously formed. In working with the undivided cell and a sodium chlorid solution it is better to use oxygen carrying catalysts, such as cobalt salts, or platinum group metals, such as platinum, palladium, etc.

In the accompanying illustration I have shown, more or less diagrammatically, a generalized type of apparatus which may be used in many of the reactions described herein. In this showing reference character 1 indicates a vessel which may be made of any suitable materials, such as sheet metal, appropriately coated with a resistant inner lining. This is advantageously built so as to withstand internal pressure. It is provided with valved draw-off outlets 2 for removing liquid. It is also provided with inlet 3, supplied by pressure pump 4, through which an olefinic gas, or mixture of such gas with any other gas desired, may be supplied under any convenient pressure. As shown, the vessel is particularly adapted for electrolytic purposes and may or may not be provided with a diaphragm, shown in dotted line as 5. Such a diaphragm may be of any usual material and divide the cell into an anode chamber A and cathode chamber C. This diaphragm is advantageously perforated above the liquid level as at 6 to allow equalization of gas pressure on the two sides. This diaphragm may be, and in the present specific modification of my invention advantageously is, omitted. The vessel is provided with cover 7 which may be clamped on in any suitable manner. This cover carries hood 8 having communication with the chamber of the vessel through orifice 9. This equalizes the chamber pressure with that of the hood 8. Within this hood is mounted any simple type of blower or pump, shown here as rotary blower 10. This blower has communication with the gas space within the chamber at 11 and is provided with conduit 12 extending nearly to the bottom of the vessel. The lid may also be provided with two conduits 13 and 14 placed on each side of the diaphragm and valved respectively at 15 and 16. These two conduits unite as conduit 17, valved at 18, which expands into chamber 19. Above this chamber is a length of piping 20, valved at 21, and connecting with another chamber 22, above which is valve 23 and hopper or funnel 24. Equalizing pipe 25, valved at 26, allows equalization of pressure. This last described device enables equalization of gas pressure with that of the chamber by opening appropriate valves; and it also allows liquid to be fed to either side of the diaphragm and without disturbance of the chamber pressure. For example, a liquid may be fed into 24, and, valves 26 and 21 being closed, may be fed into 22 by opening valve 23. By now closing valve 23 and opening 26 and 21, (valve 18 being normally open) the liquid may be caused to pass down into 19 and thence by 16 or 15, the liquid may be discharged on either side of the diphragm.

Anode 27 and cathode 28 may be of any suitable metal or structure adapted to a particular electrolysis.

In one embodiment of the present invention using electrolytic oxidation the diaphragm 5 is omitted allowing free communication between the liquids in the two compartments. The vessel is charged with a solution of sodium chlorid of such strength as to give good conduction. Ethylene, or gas containing ethylene, may now be introduced into the apparatus by means of pump 4 at any pressure desired, say, 4 or 5 atmospheres. Upon now starting blower 10 into operation, the liquid is kept thoroughly saturated with dissolved ethylene. It is advantageous to run this pump or blower at such a rate that the liquid is maintained as more or less of an emulsion of gas and liquid; as a foamy mass. Upon now passing a current through the device in such a manner that 27 becomes the anode, the ethylene is oxidized to glycol which goes into solution. The oxidizing influence developed at the anode whether this be due to nascent chlorin or oxygen or oxidation products of chlorin or of the chlorid, oxidizes the dissolved olefins. This oxidation may be aided by the presence of catalysts which superadd a function of absorbing gas and redelivering to the liquid. In the present embodiment of my invention I use platinum group metals as this catalyst. Platinum black or colloidal palladium may be used.

It is best to limit the rate of development of the oxidizing action at the anode according to the rate of solution of the ethylene so that an excess of ethylene shall remain in the solution at all times where a continuous operation is used. This is for the reason that should the solution temporarily become exhausted of ethylene while oxidation is still being developed there is the danger of oxidation of glycol to form glycolic acid, etc. For this reason in continuous operation the current should be regulated in correspondence with the supply of dissolved ethylene. The apparatus may be run discontinuously, a charge of ethylene, or gas containing the same, as for example, a pyrolytic oil gas containing say 40 or 50 per cent. of ethylene and other olefins, being introduced and the pump 10 being kept in operation until the ethylene of the charge has become absorbed and oxidized. At this time the current may be interrupted and waste gas vented through 14. Another charge of ethylene, or gas containing the same, may now be introduced and so on until the concentration of glycol in the solution becomes as high as may be desired. Where no diaphragm is used there is no substantial change in the solution as regards alkalinity or acidity. If a neutral salt solution is used at the beginning it is neutral at the end. Where the supply of ethylene is sufficient and the catalyst is of suitable character there will be no oxidized chlorin compounds at the end of the operation. The final result therefore will be a neutral saline solution containing glycol; and from this solution glycol may be isolated by ways similar to the ways of recovering glycerin from salt lyes, its properties, as well as its uses, being very similar to those of glycerin. Like glycerin it is a dense, high boiling liquid which however can be blown over readily with steam. The anode may be of platinum, carbon or lead. The fluid surrounding the anode may contain, in addition to the catalyst, a carrier oxydant, such as a chromium salt, a cerium salt, a manganese salt, etc. A little platinum black, palladium or the like may be kept suspended in the liquid. Other bodies having an absorbent action but not so much catalytic action, such as charcoal and boneblack may be used. But I regard the platinum group metals, which have both absorbent and catalytic properties, as the best for the present purposes.

Using salt solution as the electrolyte, the cell may be worked under conditions analogous to those used in making hypochlorites. In such an event, the cathode should be of small effective area to give a high current density and permit escape of hydrogen without reduction of oxidized chlorin compounds. It is desirable to keep the temperatures low, ordinary temperature being suitable, and to maintain an excess of ethylene dissolved in the solution.

Operating with pure ethylene, such as that made by the hydrogenation of acetylene, in the cell, pure glycol will be formed. But with pyrolytic gases containing ethylene, such as those obtained by cracking oils at low temperatures, there will usually be propylene and the butylenes present. These also make valuable glycols. The present process may be used in connection with the pure propylene or the pure butylenes in making propylene glycol and butylene glycols.

Apparatus of the type described and shown may also be used for non-electrolytic methods under the present invention. By omitting diaphragm 5, anode 27 and cathode 28, an oxidizing liquid may be fed in at a regulated rate through funnel 24 and connected parts. This oxidizing liquid may be a milk of bleaching powder. It contains hypochlorite of calcium which may be regarded as an oxidation product of calcium chlorid. It may be made in an electrolytic cell in the same way as is described for sodium hypochlorite but ordinarily is made by producing chlorin in a suitable cell and contacting it with lime elsewhere. Bleaching powder and water may be fed in through 24 until the apparatus is charged to a sufficient extent. In this charge may be a very small proportion of a cobalt salt. Ethylene may then be fed in and circulated as before. In the presence of a cobalt salt as a catalyst hypochlorite solutions, such as those made from bleaching powder, give up oxygen at a slow rate and this oxygen oxidizes the ethylene. The rate may be controlled by controlling the amount of cobalt salt or other catalyst present and should be such that the rate of development of oxygen does not exceed the rate of solution of ethylene.

The apparatus may be maintained at any suitable pressure and temperature. Ethylene or a mixture of ethylene and air may be fed in and circulated. The liquid may be kept charged with suspended or dissolved catalytics, such as platinum black, palladium, alkaline manganates, etc. The ethylene in solution should always be in excess to cause oxidation to affect it rather than its oxidation products.

In using weak ethylenic gases, such as those from cracking oil, from acetylene hydrogenated by nickel in the presence of a diluent gas, etc., if operating with a single electrolytic cell discontinuously, that is, with successive charges of gas introduced and circulated until the ethylene is absorbed, there is a periodic variation in the strength of current required. For example, with a fresh charge of oil gas containing, say, 45 per cent. ethylene and other olefins with the residue largely ethane, the absorption of the gas is at first relatively rapid, but as the ethylene disappears solution becomes slower; being for instance considerably slower when the richness in ethylene is reduced to 30 per cent. This may need a corresponding change in the current supply. By operating a number of cells in series, as regards the gas feed, each such cell venting gas into the next in series, this inconvenience may be overcome, each cell then operating with gases of a constant average content; the first, say with gas averaging 40 per cent., the next with gas averaging 30 per cent. and so on, each cell then having a constant current supply.

Gas of any desired degree of purity may however be obtained from lean ethylenic gas by scrubbing the latter by a countercurrent of spirits of turpentine, heavy oil or any other solvent for ethylene, exhausting the charged solvent by vacuum or heat, or both, and returning the exhausted solvent for fresh use with the gas to be scrubbed. The rich ethylene obtained by exhausting the charged oil may then be oxidized.

In the specific embodiment of my invention claimed in the present case the liquid forming the electrolyte is a solution of common salt and electrolysis is in an undivided cell. In this liquid oxidation with or without development of oxidized chlorids or oxidized chlorin compounds occurs. The liquid is kept saturated with ethylene or another olefin, or with the mixed olefins of oil gas and absorption and oxidation are aided by the presence of an absorbent and catalytic body which is best one of the platinum group metals, such as platinum or palladium, though other catalysts may be used. The oxidized chlorid or oxidized compound of chlorin may however be produced elsewhere, and supplied to a separate reaction chamber and there treated with the olefin. Whether the oxidized chlorin compound be developed, so to speak, *in situ*, or whether it be supplied from another source, the solution however should be kept as nearly as may be saturated with dissolved ethylene or olefins during the action. In the absence of an excess of olefin, such carrier catalysts or oxidizing catalysts as platinum black, palladium, etc., may carry the oxidation further than is here desired.

What I claim is:—

1. The process of making glycols which comprises electrolyzing a chlorid solution in a diaphragmless cell in such manner as to oxidize said chlorid, and maintaining the electrolyte saturated with a gaseous olefin in the presence of an oxygen carrying catalyst.

2. The process of making glycols which comprises electrolyzing sodium chlorid in a diaphragmless cell in such manner as to oxidize said chlorid, and maintaining the electrolyte saturated with a gaseous olefin in the presence of an oxygen carrying catalyst.

3. The process of making glycols which comprises electrolyzing a chlorid solution in a diaphragmless cell in such manner as to oxidize said chlorid, and maintaining the electrolyte saturated with oil gas in the presence of a platinum group metal as a catalyst.

4. The process of making glycols which comprises electrolyzing sodium chlorid in a diaphragmless cell in such manner as to oxidize said chlorid, and maintaining the electrolyte saturated with a gaseous olefin in the presence of a platinum group metal as a catalyst.

5. The process of making glycols which comprises maintaining a solution of an oxidized chlorid salt saturated with a dissolved olefin in the presence of a platinum group metal as a catalyst.

6. The process of making glycols which comprises maintaining a solution of an oxidized chlorid salt saturated with oil gas in the presence of a catalyst.

7. The process of making glycols which comprises maintaining a solution of an oxidized chlorid salt saturated with oil gas in the presence of a platinum group metal as a catalyst.

8. The process of making glycols which comprises agitating a solution containing a dissolved oxidized chlorin salt with oil gas in the presence of a catalyst.

9. The process of making glycols which comprises agitating a solution containing a dissolved oxidized chlorin salt with oil gas in the presence of a platinum group metal as a catalyst.

10. The process of oxidizing gaseous olefins which comprises emulsifying such olefins with a chlorid electrolyte during electrolysis and in the presence of a catalyst.

11. The process of oxidizing gaseous olefins which comprises emulsifying such olefins with a liquid containing products of the electrolytic oxidation of a chlorid and also containing a platinum group metal as a catalyst.

12. The process of oxidizing gaseous olefins which comprises emulsifying such olefins with a liquid containing a salt of an oxygenated acid of chlorin and also containing a platinum group metal as a catalyst.

13. The process of oxidizing gaseous olefins which comprises electrolyzing a chlorid electrolyte in a diaphragmless cell and emulsifying the electrolyte with such olefins in the presence of a platinum group metal as a catalyst.

14. The process of making useful products from oil gas which comprises emulsifying oil gas with a chlorid electrolyte during electrolysis and in the presence of a catalyst.

15. The process of oxidizing gaseous olefins which comprises electrolyzing a chlorid electrolyte in a diaphragmless cell and emulsifying the electrolyte with oil gas in the presence of a platinum group metal as a catalyst.

16. The process of making glycols, which comprises bringing an olefin in gaseous state in contact with a solution of an oxidized halid salt in the presence of a platinum group metal as a catalyst.

17. In the process of producing oxidation products of the olefins, the step which consists in subjecting an olefin to the action of an oxidizing agent in the presence of a catalyst while maintaining the olefin in excess.

In testimony whereof, I affix my signature.

K. P. McELROY.